Figure 1:
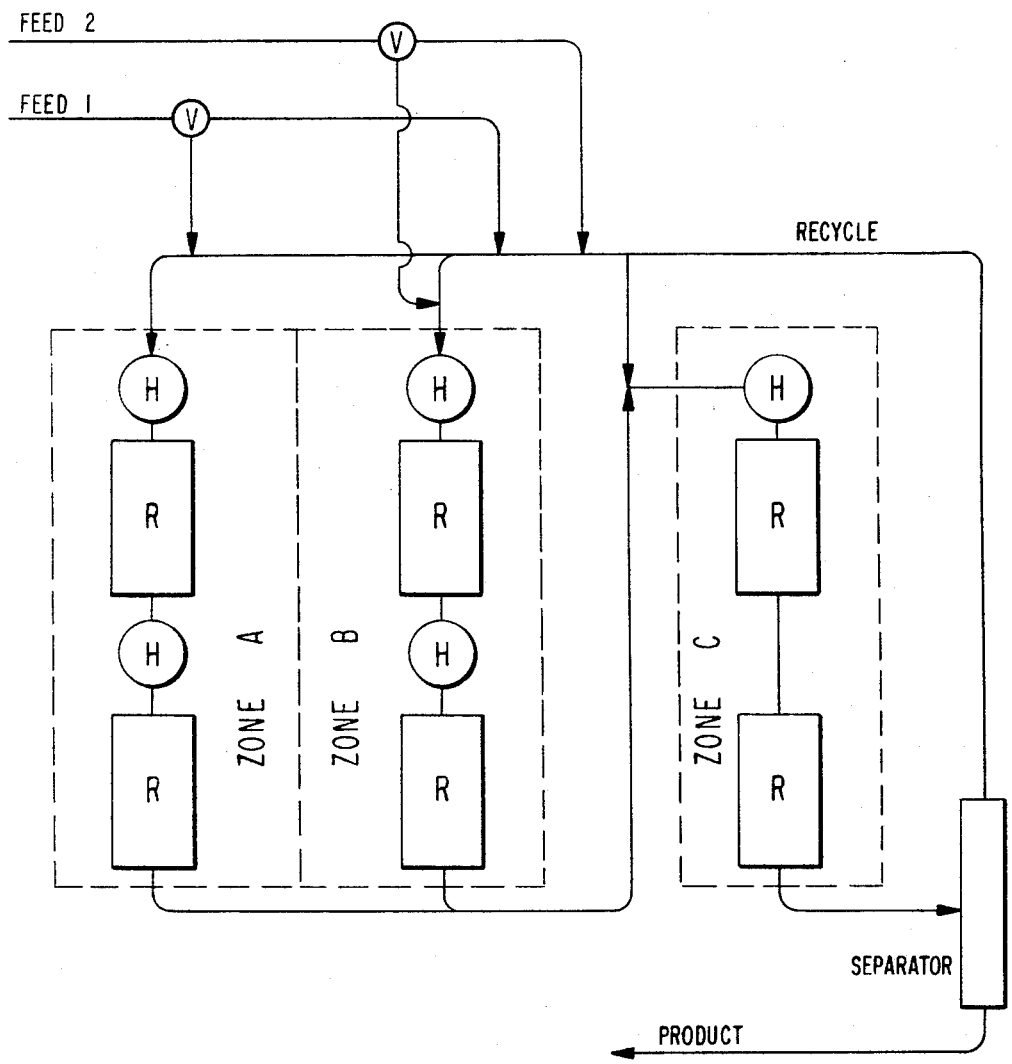

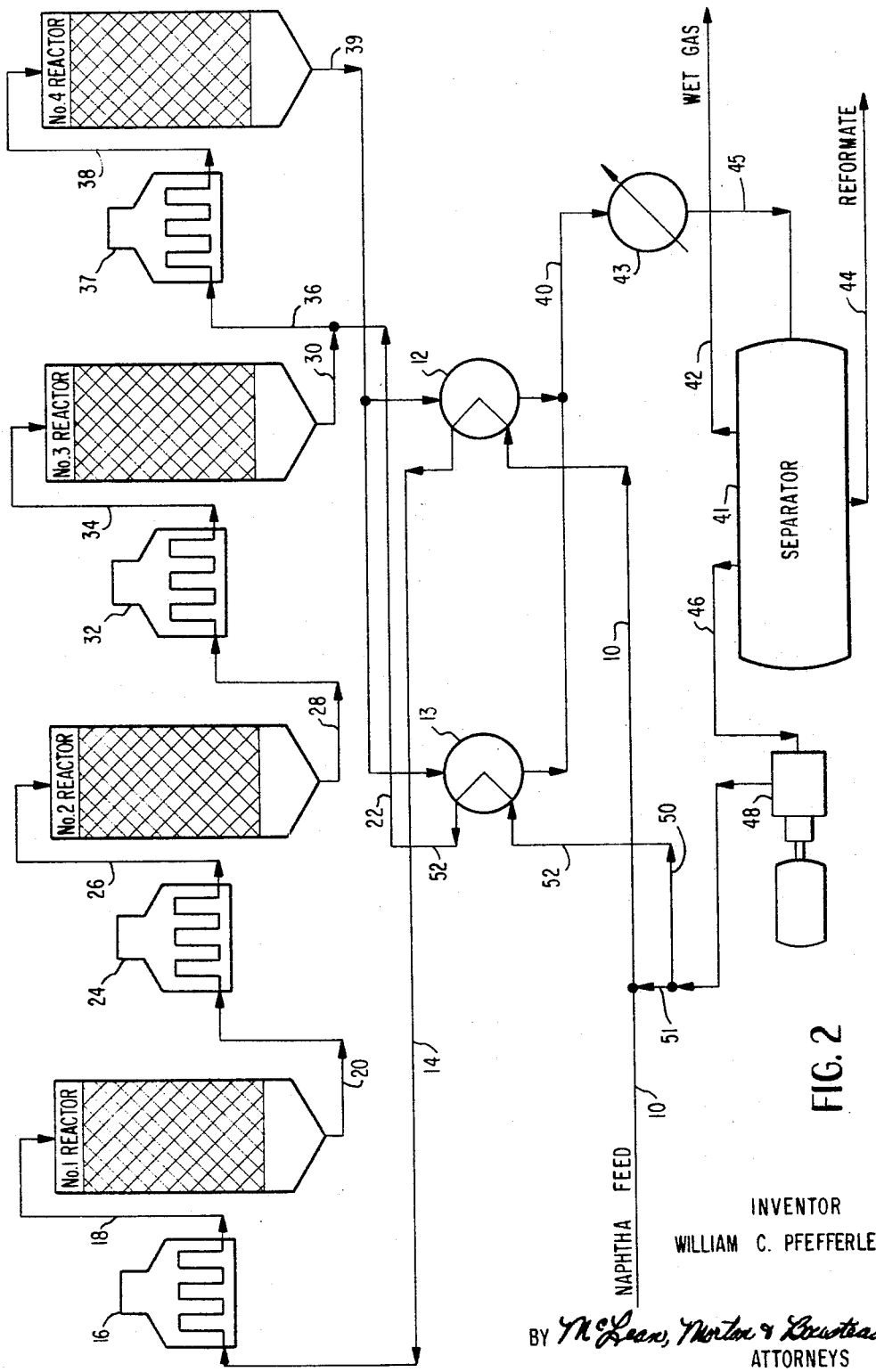

UNITED STATES PATENT OFFICE 3,392,107
Patented July 9, 1968

3,392,107
PROCESS FOR REFORMING NAPHTHENE AND PARAFFIN CONTAINING HYDROCARBONS IN THE NAPHTHA BOILING POINT RANGE IN SEVERAL STAGES TO OBTAIN A HIGH OCTANE GASOLINE
William C. Pfefferle, Middletown, N.J., assignor, by mesne assignments, to Sinclair Research, Inc., a corporation of Delaware
Filed Jan. 5, 1966, Ser. No. 518,910
12 Claims. (Cl. 208—65)

The present invention is directed to the catalytic reforming of hydrocarbon fractions. More particularly this invention is concerned with the catalytic reforming in the presence of molecular hydrogen of naphthene and paraffin-containing hydrocarbon fractions boiling primarily in the gasoline or naphtha range in a multiple, adiabatic, fixed catalyst bed conversion system employing platinum group metal-alumina catalysts to improve the octane number of the feed.

In view of the endothermic nature of catalytic reforming reactions there is usually employed a series of adiabatic catalyst bed reactors. One method comprises preheating the naphtha charge to the desired inlet temperature, passing it to the first reactor, reheating effluent from the first reactor, and passing it into the second reactor and so on through the remaining reheaters and reactors of the series. The inlet temperatures of each of the adiabatic reactors can be the same or different and generally fall in the range of about 900 to 960° F. or more. The temperature drop exhibited in each of the series of catalyst beds progressively decreases. For instance, the temperature drop in the first reactor of a three reactor series usually ranges between 50 to 150° F. whereas the temperature drop in the terminal reactor is generally 25° F. maximum and often is exothermic especially in high octane-high pressure operations, e.g. 325 p.s.i.g. or more. Thus, the average temperature of the individual beds varies, with the highest average bed temperature being in the last or terminal reactor. Since the terminal catalyst bed has the highest average bed temperature, the platinum metal catalyst in the terminal reactor is the first to deactivate and is ordinarily the limiting factor in the processing cycle since the aging rate of platinum metal catalysts increases exponentially with temperature. A longer processing cycle life becomes very desirable in that it may avoid the necessity of regeneration, e.g. when entering a peak period of operation.

Although the fastest catalyst deactivation occurs in the terminal reactor, wherein paraffin dehydrocyclization is a principal reaction, there is also considerable coke deposition on the catalyst in the first reactor wherein under the normal temperatures employed, there is hydrocracking and dehydrocyclization occurring along with dehydrogenation of naphthenes to aromatics, the predominant reaction in the first reactor. When the coke deposition on the catalyst of the terminal reactor has accumulated to a level which either gives rise to a loss of catalyst selectivity with resultant yield loss, or seriously affects the regeneration efficiency of the catalyst and the catalyst must be regenerated, the catalyst in the early reactors is usually also regenerated. The result therefore, is significant loss in potential processing time in the catalyst of the first or early reactors.

Moreover, non-uniform distribution of coking of catalyst occurs in the first reactor in view of the relatively large temperature drop experienced in this reactor, so that the coke deposited on the catalyst in the upper part of the bed is considerably greater than that in the lower part of the bed. Although it is often considered that the first reactor need not be regenerated when such is required in the terminal reactor, the upper portion of the catalyst in the first reactor does in fact need regeneration due to the high coke level on the catalyst of this portion of the bed and the selectivity loss due to the extensive naphthene cracking occurring in this section, particularly when temperatures are raised. For ease of convenience, however, the entire bed of catalyst in the first reactor is commonly regenerated when the terminal reactor catalyst is regenerated and consequently there is often unnecessary premature application of high regenerative temperatures to a large portion of catalyst in the first reactor which is not yet in need of regeneration. The result may be aging of large portions of the temperature-sensitive catalyst in the first reactor before it has had an opportunity to realize its maximum utility.

The current trend in the operation of catalytic reforming units is to increase the severity of operations for the production of reformates having clear octanes of at least about 90 RON, preferably at least about 95 RON. These operations which involve increased reforming temperature are commonly referred to in the art as "high severity" reforming and are characterized by relatively short process cycles and reduced liquid yields even at reduced pressures. Heretofore, prior art processes directed to increasing processing cycle time under these high severity operations have been faced with difficulties with respect to maintaining yields of desired product.

It has now been found that the improved reforming process of the present invention not only increases the processing cycle length and substantially reduces catalyst aging both in an early reaction zone of the reforming system wherein naphthene dehydrogenation is a principal reaction, and in a subsequent zone wherein paraffin dehydrocyclization is a principal reaction, but also increases yields of high octane gasoline even when the operation is conducted at high severity conditions. Special reforming procedures and conditions as hereinafter described are provided for at least one naphthene dehydrogenation zone and for at least one paraffin dehydrocyclization zone. Reactors of the former zone operate selectively for dehydrogenation of naphthenes, and reactors of the latter zone with a feed of low naphthene content are superior for dehydrocyclization of paraffins.

The process of the present invention employs a reforming system using a supported platinum group metal catalyst, molecular hydrogen and a plurality of adiabatic, fixed bed catalyst reaction zones arranged in series. Each of said plurality of reaction zones has at least one adiabatic, fixed bed catalytic reaction preceded by at least one heater for heating the hydrocarbon and recycle gas being processed. An early portion of the plurality of reaction zones defines at least one naphthene dehydrogenation zone maintained under certain conditions, and a subsequent portion of said plurality of reaction zones defines at least one paraffin dehydrocyclization zone also maintained under certain conditions. Advantageously, the naphthene dehydrogenation zones and the paraffin dehydrocyclization zones include all the reaction zones. Ordinarily, feeds with high naphthene content are processed in naphthene dehydrogenation zones comprising in series more than one reactor, and feeds with high paraffin content are processed in paraffin dehydrocyclization zones comprising in series more than one reactor. Heaters preceding the reactors are provided as needed with the capacity to give the desired inlet temperature for each reactor.

To make clearer the nature of naphthene dehydrogenation zones and paraffin dehydrocyclization zones as contemplated in the present invention the appended FIG. 1 is provided. This is a schematic reformer process system with omission of gas compressor, heat exchangers and cooler to how a particular reforming arrangement with two naphthene dehydrogenation zones (Zones A and B) and one paraffin dehydrocyclization zone (Zone C). A total of six reactors R are distributed with two in series in each zone, each reactor being a separate catalyst bed which may or may not be situated in a separate pressure vessel. The recycle gas passes in accordance with the invention partly to the naphthene dehydrogenation zones and partly to the paraffin dehydrocyclization zone. Heaters H are provided as shown in the figure before all reactors except the second paraffin dehydrocyclization zone reactor. The feed passes with recycle first to the naphthene dehydrogenation zones and then to the paraffin dehydrocyclization zone and the separator for product and recycle. With two separate naphthene dehydrogenation zones in the reactor system, if desired two separate feeds, Feed 1 and Feed 2 as shown in FIGURE 1, may be given initial processing separately under differing optimized conditions. Alternatively a single feed may be processed or two feeds may be blended with the recycle for processing under the same conditions in Zones A and B.

The hydrocarbon being processed is of gasoline or naphtha boiling range and the effluent from each of the plurality of reaction zones is heated before being introduced into the next zone. Gases containing hydrogen and usually some hydrocarbons are separated from the effluent from the last reactor and constitute a gas recycled in a particular manner. The endothermic reforming conditions are those that provide a product having a clear research octane number of at least 90, preferably at least 95, and often include pressures of about 100 to 500 p.s.i.g. The catalysts employed are the supported platinum group metal reforming catalysts. Most commonly, these comprise about 0.1 to 2 percent by weight of platinum group metal component on an activated alumina base. Other supports may be used, for instance they may be composed partially or completely of a crystalline aluminosilicate or other suitable material. Such catalysts can also include promoters. The platinum group metal of the catalyst is an essential component and these metals include, for instance, platinum, rhodium, palladium and iridium.

In accordance with the improvement of the present invention a petroleum hydrocarbon of gasoline or naphtha boiling range containing naphthenes and paraffins is introduced together with recycle gas into the first of one or more reactors of each naphthene dehydrogenation zone in the reforming system and the partially reformed product of the reaction in such first reactors is conducted serially into any other reactors of the respective naphthene dehydrogenation zones. Heater capacity is provided before each reactor of such zones as needed to maintain inlet temperatures of such reactors between about 820° to 920° F., preferably 840° to 890° F., for at least about 80% of the total reforming process time while passing hydrogen-containing recycle gas to the naphthene dehydrogenation zones at a rate of about 0.5 to 8 moles, preferably 1 to 6 moles, of recycle gas per mole of hydrocarbon introduced into the naphthene dehydrogenation zones. Preferably, the inlet temperatures are controlled to prevent a change in the total temperature drop in the naphthene dehydrogenation zones of more than about 30° F., for at least about 80% of the total reforming process time based on a given feed. The reaction time in the naphthene dehydrogenation zones is sufficient to provide a conversion of naphthenes to aromatics of about 75 to 95% and a hydrocarbon effluent from the last reactors of such naphthene dehydrogenation zones of less than about 10% naphthenes. Also in accordance with the improvement of the invention, hydrocarbon effluent and recycle gas are passed to each of one or more paraffin dehydrocyclization zones subsequent to the naphthene dehydrogenation zones in the reforming system at an inlet temperature of about 900 to 1000° F. while passing a portion of the hydrogen-containing recycle gas directly, i.e., not to a prior reactor, to the paraffin dehydrocyclization zones at a rate such that about 7 to about 30 moles, preferably about 10 to 20 moles, of total recycle gas per mole of hydrocarbon passes into the zones and controlling the inlet temperature to provide a normally liquid reformate having a research octane number of at least 90. In general, at least about 3 moles of recycle gas, preferably at least 5 moles, per mole of hydrocarbon passing into the paraffin dehydrocyclization zones, are added directly to the paraffin dehydrocyclization zones. The hydrogen-containing recycle gas passed directly to the paraffin dehydrocyclization zones is often at least one-third, preferably at least two-thirds, of the total hydrogen-containing gas recycled to the naphthene dehydrogenation and paraffin dehydrocyclization zones. This direct recycle to the paraffin dehydrocyclization zones is preferably four-fifths of the total recycle when the gasoline or naphtha being reformed has at least about 60 volume percent paraffins. Preferably the inlet temperature of the first reactors of the paraffin dehydrocyclization zones is maintained below the inlet temperature of any respective subsequent reactor of such zones by no more than 50° F. for at least about 80% of the total reforming process time. The catalyst volume in the naphthene dehydrogenation zones compared to that of the paraffin dehydrocyclization zones is about 1:20 to 3:1; preferably, this ratio is at least 1:2 when the naphthene content of the gasoline or naphtha feed is no less than about 30 volume percent, and this ratio is less than 1:2 and at least about 1:10 when the paraffin content of the gasoline or naphtha feed is at least about 60 volume percent.

Under the reaction conditions and control employed in the naphthene dehydrogenation zones, the selectivity to aromatics is significantly increased and the reaction of naphthenes to aromatics occurs rapidly, while at the same time the hydrocracking that occurs in these reaction zones under the higher temperature conventional conditions is substantially reduced. By virtue of the conditions selected, little paraffins are either produced or lost in the naphthene dehydrogenation zones of the invention. Thus, not only are the yields of aromatics produced in the naphthene dehydrogenation zones increased but catalyst deactivation is reduced. Also, catalyst aging is reduced and maximum total catalyst utility is approached through a lessening in degree of non-uniform coking normally occurring in the initial reactor of the series of reactors utilized in conventional reforming.

The conditions selected and the manner of operating the paraffin dehydrocyclization zones, on the other hand, have been found to greatly increase the paraffin dehydrocyclization activity of the platinum group metal on alumina reforming catalysts. Moreover, the cracking that normally occurs in conventional reforming operations wherein the inlet temperature of the initial reactors is sufficiently high to cause significant paraffin cracking, especially as reactor inlet temperatures are increased to maintain the desired product octane level, has been decreased. The decrease in cracking as far as the naphthene dehydrogenation zones are concerned is due to the low temperature of operation, and as far as the paraffin dehydrocyclization zones are concerned is due to previous removal of naphthenes thereby avoiding naphthene cracking, and to high recycle gas ratios favoring dehydrocyclization over cracking. The reduced cracking, moreover, decreases exothermicity. Thus, in accordance with this invention the actalysts of both the naphthene dehydrogenation zones and the paraffin dehydrocyclization zones are operated under over-all endothermic conditions for each of said zones. Preferably, each of the naphthene dehydrogenation zone reactors and the paraffin dehydrocyclization zone reactors is by itself operated under endothermic conditions. Thus, catalyst aging in the paraffin dehydrocyclization zones is improved and an over-all reforming system established which provides higher yields in a given octane operation than possible by conventional operation at the same temperature and pressure.

The naphthene dehydrogenation and paraffin dehydrocyclization zones and their operation will be discussed below in more detail under separate headings:

NAPHTHENE DEHYDROGENATION ZONES

The naphthene dehydrogenation zones of the invention include those reaction zones operating under the conditions and controls specified above and effect as a predominant reaction the dehydrogenation of naphthenes. There is at least one naphthene dehydrogenation zone reactor and there may be two, three or more of such reactors in series in a naphthene dehydrogenation zone. More than one reactor in a naphthene dehydrogenation zone is especially desirable for feeds with high naphthene contents.

As aforementioned, the inlet tempertures of hydrocarbon feed and recycle gases to the naphthene dehydrogenation zones are about 820° to 920° F. and for at least about 80% of the total reforming process time are not permitted to exceed 920° F. When there are at least two reactors in a naphthene dehydrogenation reaction zone, I prefer that the inlet temperature of the first of such reactors be maintained at 900° F. maximum and the inlet temperatures of the second of such reactors be maintained at 910° F. maximum for at least about 80% of the total reforming process time. Moreover, contrary to conventional reforming systems, increase of the inlet temperature of reactors of the naphthene dehydrogenation zones need not be made on the basis of octane number loss in the desired product but rather can be made on the basis of change in the temperature drop occurring in the naphthene dehydrogenation zones. The temperature drop in the initial reactor of a conventional series is dependent on the established reforming operation but ordinarily is in the range of about 50 to 150° F. In accordance with the present invention the inlet temperatures of reactors of a particular naphthene dehydrogenation zone are preferably controlled to keep the total temperature drop of said naphthene dehydrogenation zone during the established operation from varying more than about 30° F. for at least about 80% of the total processing cycle, preferably for essentially the entire processing cycle. Should, for any reason, there be a change altering the processing cycle to another set of reforming conditions, that is, a new established operation, e.g., change in feed composition or rate, operating pressure, or gas recycle ratio, the inlet temperature can be controlled accordingly on the basis of the temperature drop exhibited by the new established operation. However, the conditions of the naphthene dehydrogenation zones, regardless of the established operation of the reforming cycle, conform to those defined by the present invention. The pressures and liquid hourly space velocity employed in the naphthene dehydrogenation zones may vary depending upon the inlet temperature, the amount of hydrogen-containing recycle gas present and the naphthene content of the hydrocarbon feed but in any case are selected to effect the aforementioned, about 75 to 95% conversion of naphthenes to aromatics and to provide an effluent from the last reactor of each naphthene dehydrogenation zone which contains below about 10% naphthenes. Thus, in cases where there is more than one reactor in a naphthene dehydrogenation zone the 75–95% conversion of naphthenes to aromatics is that effected by the total number of such reactors and the effluent of less than 10% naphthenes is that withdrawn from the last reactor of the naphthene dehydrogenation zone. Frequently, the conditions in the naphthene dehydrogenation zones fall in the range of about 100 to 500 p.s.i.g., preferably about 200 to 400 p.s.i.g., and about 0.5 to 4 over-all liquid weight hourly space velocity.

PARAFFIN DEHYDROCYCLIZATION ZONES

The paraffin dehydrocyclization zones of the present invention include those reaction zones operating under the conditions specified above and effecting as a principal reaction the dehydrocyclization of paraffins to aromatics. The over-all paraffin dehydrocyclization zone comprises at least one reactor subsequent to the naphthene dehydrogenation zones and preferably no reactors follow the paraffin dehydrocyclization zone.

The hydrocarbon effluent and recycle gas introduced into each reactor of the paraffin dehydrocyclization zones of the invention are at temperatures of about 900 to 1000° F., and the temperatures of such reactors are controlled to provide a final product of at least 90 Research Octane Number. Preferably, the inlet temperatures are initially about 900 to 960° F. and at least 20° F. greater than the inlet temperatures of the reactors of the naphthene dehydrogenation zones for at least about 50% of the total reforming process time. The inlet temperatures of reactors of the paraffin dehydrocyclization zones are usually increased during the processing cycle up to as high as about 1000° F., in order to maintain the target octane. Ordinarily, the inlet temperature of the last reactors of the dehydrocyclization zones exceeds about 930° F., for at least about 25% of the total reforming process time.

Due to more equal aging of catalyst beds in accordance with this invention than in conventional reforming, swing operation of late reactors, i.e. those of the paraffin dehydrocyclization zones, generally is unnecessary. The reforming system of the present invention may be made up solely of naphthene dehydrogenation reaction zones and paraffin dehydrocyclization reaction zones, or the reforming system may contain as well other reaction zones which are neither naphthene dehydrogenation nor paraffin dehydrocyclization zones, as characterized herein for all or part of the processing cycle.

The feeds employed in the process of the invention are petroleum reforming stocks boiling in the gasoline or naphtha boiling range which are composed of at least about 15% up to about 70% naphthenes and at least about 25% paraffins. Ordinarily the feeds also contain aromatics and are preferably olefin-free. Advantageously, the feeds of the invention contain less than about 10 p.p.m. sulfur, less than about 5 p.p.m. nitrogen and less than about 30 p.p.m. water. Superior operation is provided where the feeds and recycle gas stream are purified as by passage through molecular sieves, to less than about 5 p.p.m. water, less than about 4 p.p.m. sulfur and less than about 2 p.p.m. nitrogen.

By "total reforming process time" as used herein is meant the total time of reforming hydrocarbons between catalyst regenerations, that is, carbon burn-off, or catalyst replacement if this is done rather than catalyst regeneration.

The heat input to the hydrocarbon feed and hydrogen-containing gases, sometimes referred to as heater duties when a furnace is employed, passing to the inlets of all reactors of the naphthene dehydrogenation zones is often not over about 150% of the heat input to the hydrocarbon feed and hydrogen-containing gas passing to the inlets of all reactors of the paraffin dehydrocyclization zones. Preferably, the heater duty to the naphthene dehydrogenation zones is not over about 80% of that to the paraffin dehydrocylization zones, especially when the gasoline or naphtha being reformed contains at least about 60% by volume of paraffins. The heat input to the initial reactors of the naphthene dehydrogenation zones is that heat which must be added to the hydrocarbon feed and hydrogen recycle gas calculated or based on the initial hydrocarbon feed and gas recycle temperature before said heat input, being about 700 to 850° F., preferably about 750 to 825° F., as is often obtained by heat exchange of the hydrocarbon feed and gas recycle with the hot effluent from the last reactor of the series. It will be seen that the relationships in accordance with this invention of catalyst bed ratios and heat input ratios are intrinsic properties of the reforming system and are distributed between all the naphthene dehydrogenation zones and all the paraffin dehydrocyclization zones. The limitation of total temperature drop variation to preferably not more than 30° F., on the other hand, is a property applicable to a single naphthene dehydrogenation zone.

The following examples are included to further illustrate the present invention and will be described with reference to the drawing FIG. 2 which diagrammatically illustrates the reforming system of the invention. The drawing and examples which follow, however, are presented for illustrative purposes and are not to be considered as limiting the invention.

Example I

A 20,000 BPSD naphtha reforming operation is carried out as follows employing a straight run naphtha feed containing approximately 45% naphthenes, approximately 40% paraffins and approximately 15% aromatics. The naphtha feed has an initial boiling point of approximately 150° F., a 50% boiling point of approximately 250° F., and an end boiling point of approximately 380° F. The impurity levels of the naphtha feed are about 30 p.p.m. $H_2O$, about 8 p.p.m. S, and about 4 p.p.m. N.

In accordance with the accompanying FIG. 2 40 RON naphtha feed enters via line 10 and passes into heat exchanger 12 in admixture with 3 mols of hydrogen-containing recycle gas from line 51 per mol of naphtha. In heat exchanger 12, the mixture is heated to temperatures of about 825° F., by indirect heat exchange with part of the effluent from the final reforming reactor. The thus-heated mixture is then passed by line 14 to the first reactor preheater 16. The first reactor preheater effluent passes by line 18 to Reactor No. 1, at an inlet temperature of 890° F., at the beginning of the processing cycle. The nominal heater duty to oil at the inlet of Reactor No. 1 is 15M B.t.u./hr. The reactor system is at a pressure of about 350 p.s.i.g. The first reactor, as well as the three subsequent reactors, contains a fixed bed of platinum on alumina (about 0.6% Pt) catalyst. The catalyst reactor distribution is 1:1:1:3 and the over-all weight hourly space velocity is 2.0. The effluent of Reactor No. 1 which is at a temperature about 120° F. lower than the inlet temperature is carried by line 20 to interheater 24, where it is brought to an inlet temperature of 900° F., for Reactor No. 2.

The effluent from interheater 24 is conveyed to the Reactor No. 2 by way of line 26. The temperature of the effluent from Reactor No. 2 is about 95° F. lower than the inlet temperature. The nominal heater duties to oil at the inlet of Reactor No. 2 are 35M B.t.u./hr. Effluent from Reactor No. 2 is passed through line 28 into interheater 32 where it is reheated to 915° F., prior to being introduced via line 34 into Reactor No. 3. The nominal heater duties to oil at the inlet of Reactor No. 3 are 25M B.t.u./hr. Effluent removed from Reactor No. 3 is at a temperature about 50° F. lower than the inlet temperature of the reactor. The effluent from Reactor No. 3 containing about 5% by weight naphthenes is sent via line 30 to a junction with the remainder of the hydrogen-containing gas. The combined feed and recycle gas are then sent via line 36 to interheater 37 where they are heated to a temperature of 965° F., prior to introduction through line 38 into Reactor No. 4, where the reforming is completed. The naphthene content of the Reactor No. 3 effluent of about 5% represents a conversion of naphthenes to aromatics in Reactors Nos. 1, 2 and 3 of about 80%. The nominal heater duties to oil at the inlet of Reactor No. 4 are 55M B.t.u./hr.

Product removed from Reactor No. 4 is at a temperature of about 15° F. lower than the 965° F., inlet temperature. The product passes out line 39, is split into two streams and the streams sent through heat exchangers 12 and 13 respectively and then via line 40 to the cooler 43 and next by line 45 to the separator 41. Hydrogen and light gases, including hydrocarbon gases such as methane, ethane, propane and possibly hydrogen sulfide, are discharged from the separator 40 through line 42. $C_5+$ liquid reformate of 98 Research Octane Number (clear) is withdrawn by way of line 44. A portion of hydrogen and light hydrocarbon gases is withdrawn through line 46 for recycle at about 300 p.s.i.g. pressure and can be treated (not shown) for removal of sulfur, nitrogen and water. It is then repressured in compressors 48 to about 400 p.s.i.g. The recycle gas from the compressors 48 is first split into two streams. Recycle gas stream in line 51 equivalent to about 3 moles of gas per mole of fresh naphtha is mixed with the incoming fresh naphtha, passed via line 10 to heat exchanger 12 where it absorbs heat from the product through indirect contact, and then by line 14 to the first reactor preheater 16 and then into Reactor No. 1. The second stream of recycle gas is routed by means of lines 50 and 52 through heat exchanger 13. Upon exiting heat exchanger 13 this heated recycle gas stream is conveyed by lines 22 and 36 into interheater 37 and then to Reactor No. 4 by means of line 38 at a recycle rate of about 9 moles of gas per mole of naphtha feed (total recycle: 12 moles of gas per mole of feed). Additional recycle streams could be provided if desired.

During the processing cycle the inlet temperature of the last reactor is periodically raised to maintain a yield of 98 RON reformate. The temperature of Reactors Nos. 1, 2 and 3 are raised 10° F., 10° F., and 5° F., respectively, to prevent change in the temperature drop in each of Reactors Nos. 1, 2 and 3 from varying more than approximately 7° F. in each reactor. Thus, the inlet temperatures of the respective reactors at the end of the processing cycle of the respective reactors are as follows:

| | °F. |
|---|---|
| Reactor No. 1 | 900 |
| Reactor No. 2 | 910 |
| Reactor No. 3 | 920 |
| Reactor No. 4 | 1000 |

A yield increase of $C_5$ to E.P. product of over 400 BPSD was provided compared to that obtained by conventional operation under conditions that give 98 RON product, for example, 2 WHSV, 7:1 hydrogen to hydrocarbon mole ratio recycle gas and reaction temperatures of 900–960° F. Also, hydrogen make is about 0.3% higher by the method of this example than by conventional operation.

EXAMPLE II

A 20,000 BPSD naphtha reforming operation is carried out with a different naphtha feed and the same apparatus, catalyst and general procedure used in Example I. As in Example I a 98 RON clear reformate is obtained. The naphtha feed for this example contains about 30% naphthenes, 55% paraffins, and 15% aromatics. The feed has a 390° F. end point and impurity levels of 4 p.p.m. $H_2O$, 4 p.p.m. S, and 2 p.p.m. N.

Operating conditions include a pressure of 350 p.s.i.g., 2.0 WHSV over-all, and a split recycle gas to hydrocarbon mole ratio of 3/1 to the inlet of Reactor 1 and a total 12/1 mole ratio to the inlet of Reactor 3. Reactor and heater information is given in the following schedule.

| Reactor No. | 1 | 2 | 3 | 4 |
|---|---|---|---|---|
| Inlet Temperature, ° F., Start | 890 | 910 | 950 | 950 |
| Inlet Temperature, ° F., End of Cycle | 890 | 910 | 980 | 985 |
| Reactor Temperature Drops, ° F | 100 | 80 | 30 | 10 |
| Nominal Furnace Duties at Reactor Inlets, M B.t.u./hr.[1] | 15 | 35 | 60 | 15 |

[1] The B.t.u.'s required to raise feed to desired temperature after the feed has been heat exchanged with last reactor effluent.

The naphthene content of the effluent from the No. 2 Reactor is about 5% by weight. Yields are about 400 BPSD higher than conventional in accordance with this example.

EXAMPLE III

In accordance with the general method of Example I, a 10,000 BPSD naphtha reforming operation is carried out with a 1:1:2:6 catalyst bed distribution to obtain a 100 RON clear reformate. The over-all space velocity of the reforming system is 1.5 and the pressure is 200 p.s.i.g. The naphtha feed has low impurities, an E.P. of 390° F., and contains about 20% naphthenes, about 65% paraffins, and about 15% aromatics. A split recycle is used with a 3/1 recycle gas to hydrocarbon mole ratio going to the first reactor and a total 17/1 mole ratio to the third reactor. Reactor inlet temperatures are respectively 860°, 870°, 930°, and 950° F., at the start of the cycle and are increased to 880°, 890°, 980°, and 990° F., at the end of the cycle.

Example IV

In accordance with the general procedure of Example I, a 10,000 BPSD naphtha reforming operation is carried out with a 1:1:2:3 catalyst bed distribution to 100 RON clear reformate. The over-all WHSV of the reforming system is 2.0 and the pressure is 200 p.s.i.g. The naphtha feed has low impurities, an E.P. of 380° F., and contains about 60% naphthenes, 30% paraffins, and 10% aromatics. A split recycle is used with a 2/1 mole ratio of recycle gas to hydrocarbon going to the first reactor, and a total 12/1 mole ratio to the 4th reactor. Reactor inlet temperatures are respectively 840°, 850°, 880°, and 930° F., at the start of the cycle and 860°, 870°, 920° and 980° F. at the end of the cycle. The naphtha feed and/or recycle gas stream can be purified to less than about 5 p.p.m. water, 4 p.p.m. sulfur and 2 p.p.m. nitrogen by passage through alumino silicates of relatively uniform pore size, e.g. Linde 10X of 13X molecular sieves.

It is claimed:

1. In a method of reforming naphthene- and paraffin-containing petroleum hydrocarbons of gasoline and naphtha boiling range in the presence of molecular hydrogen and supported platinum group metal reforming catalyst wherein is employed in series a plurality of adiabatic, fixed bed catalyst reaction zones each of said plurality of zones being preceded by heating means for the hydrocarbon processed and molecular hydrogen, to provide reformates of at least 90 RON and hydrogen-containing recycle gas, the improvement which comprises providing at least one naphthene dehydrogenation zone as an early portion of said plurality of reaction zones and at least one paraffin dehydrocyclization zone as a latter portion of said plurality of reaction zones, introducing petroleum hydrocarbon of gasoline or naphtha boiling range containing at least about 15% by volume of naphthenes and at least about 25% by volume of paraffins into the first reactors of such naphthene dehydrogenation zones at inlet temperatures for naphthene dehydrogenation zone reactors of about 820 to 920° F. for at least about 80% of the total reforming process time while passing a portion of said recycle gas to such naphthene dehydrogenation zones at a rate of about 0.5 to 8 moles of recycle gas per mole of hydrocarbon feed and for a reaction time sufficient to provide a conversion of naphthenes to aromatics of about 75 to 95% and an effluent from such naphthene dehydrogenation zones having less than about 10% by weight naphthenes, passing said effluent from said naphthene dehydrogenation zone through said paraffin dehydrocyclization zone, the inlet temperatures of reactors of such paraffin dehydrocyclization zones being about 900 to 1000° F. and controlled to give a reformate of at least 90 RON, said inlet temperatures being at least 20° F. greater than the inlet temperatures of the first reactor of the naphthene dehydrogenation zones for at least about 50% of the total reforming process time, while passing a portion of the hydrogen-containing recycle gas to such paraffin dehydrocyclization zones at a rate such that the total gas recycle to the paraffin dehydrocyclization zones is about 7 to 30 moles of said recycle gas per mole of feed, said portion of hydrogen-containing recycle gas to said paraffin dehydrocyclization zones being at least a third of the total hydrogen-containing recycle gas recycled, the catalyst volume distribution of the naphthene dehydrogenation zones to the paraffin dehydrocyclization zones being between about 1:20 to 3:1 and maintaining such zones under endothermic conditions.

2. The improvement of claim 1 wherein the naphthene content of the petroleum hydrocarbon feed of gasoline or naphtha boiling range being processed is at least about 30 volume percent and the catalyst volume distribution of the naphthene dehydrogenation zones to the paraffin dehydrocyclization zones is at least 1:2.

3. The improvement of claim 1 wherein the change of total temperature drop from inlet to outlet of each naphthene dehydrogenation zone is controlled from varying more than 30° F. during at least about 80% of the total reforming process time.

4. The improvement of claim 1 wherein the inlet temperatures of the reactors of the naphthene dehydrogenation zones are between about 840 to 890° F.

5. The improvement of claim 1 wherein the mole ratio of hydrogen-containing recycle gas to hydrocarbon in the naphthene dehydrogenation zones is about 1 to 4:1 and the mole ratio of hydrogen-containing recycle gas to hydrocarbon in the paraffin dehydrocyclization zones is about 10 to 20:1.

6. The improvement of claim 1 wherein the impurity levels of both the feed and recycle gas are below about 30 p.p.m. water, 10 p.p.m. sulfur and 5 p.p.m. nitrogen.

7. The improvement of claim 1 wherein the impurity levels of both the feed and recycle gas are below about 5 p.p.m. water, 4 p.p.m. sulfur, and 2 p.p.m. nitrogen.

8. The improvement of claim 1 with the additional provision that the heat input to the hydrocarbon feed and hydrogen-containing gas passing to the inlets of reactors of the naphthene dehydrogenation zones is not over about 150% of the heat input to the hydrocarbon feed and hydrogen-containing gas passing to the inlets of reactors of the paraffin dehydrocyclization zones.

9. The improvement of claim 1 wherein there are at least two reactors in series in a naphthene dehydrogenation zone and the inlet temperature of the first such reactor is maintained at 900° F. maximum and the inlet temperature of the second such reactor is maintained at 910° F. maximum for at least about 80% of the total reforming process time.

10. The improvement of claim 1 wherein the petroleum hydrocarbon feed of gasoline or naphtha boiling range being processed contains at least about 60% by volume of paraffins and the catalyst volume distribution of the naphthene dehydrogenation zones to the paraffin dehydrocyclization zones is less than 1:2 and at least about 1:10.

11. The improvement of claim 10 in which the hydrogen-containing recycle gas to the paraffin dehydrocyclization zones is at least four-fifths of the total recycle.

12. The improvement of claim 10 in which the heat input to the hydrocarbon feed and hydrogen-containing gas passing to the inlets of reactors of the naphthene dehydrogenation zones is not over about 80% of the heat input to the hydrocarbon feed and hydrogen-containing gas passing to the inlets of reactors of the paraffin dehydrocyclization zones.

References Cited

UNITED STATES PATENTS 2,965,560  12/1960  Smith _____ 208—65
3,011,965  12/1961  Decker _____ 208—65

DELBERT E. GANTZ, *Primary Examiner.*

ABRAHAM RIMENS, *Examiner.*